United States Patent [19]

Adams, III et al.

[11] Patent Number: 6,151,661
[45] Date of Patent: Nov. 21, 2000

[54] CACHE MEMORY STORAGE SPACE MANAGEMENT SYSTEM AND METHOD

[75] Inventors: Henry W. Adams, III, Boca Raton; Thomas B. Genduso, West Palm Beach; Wan L. Leung, Coral Springs, all of Fla.

[73] Assignee: International Business Machines Corporation, Armonk, N.Y.

[21] Appl. No.: 08/205,737

[22] Filed: Mar. 3, 1994

[51] Int. Cl.[7] .................................................. G06F 12/12
[52] U.S. Cl. ........................................ 711/132; 711/134
[58] Field of Search ................................... 395/459, 460, 395/486, 421.03, 463, 461; 711/132, 133, 134, 136, 159

[56] References Cited

U.S. PATENT DOCUMENTS

| | | | |
|---|---|---|---|
| 3,786,432 | 1/1974 | Woods | 340/172.5 |
| 4,197,580 | 4/1980 | Chang et al. | 364/200 |
| 4,386,402 | 5/1983 | Toy | 364/200 |
| 4,530,049 | 7/1985 | Zee | 364/200 |
| 4,670,839 | 6/1987 | Pilat et al. | 364/200 |
| 4,704,679 | 11/1987 | Hassler et al. | 364/200 |
| 4,755,936 | 7/1988 | Stewart et al. | 364/200 |
| 4,811,208 | 3/1989 | Myers et al. | 364/200 |
| 4,835,738 | 5/1989 | Niehaus et al. | 364/900 |
| 4,916,604 | 4/1990 | Yamamoto et al. | 364/200 |
| 4,922,414 | 5/1990 | Holloway et al. | 364/200 |
| 4,928,239 | 5/1990 | Baum et al. | 395/463 |
| 4,947,316 | 8/1990 | Fisk et al. | 395/775 |

FOREIGN PATENT DOCUMENTS 61-127050  6/1986  Japan .

OTHER PUBLICATIONS

Intel, "Intel 386 DX Microprocessor Hardware Reference Manual", 1991, P. 1–1, 7–2 to 7–3.
Intel, "386 DX Microprocessor Programmer's Reference Manual", 1991, P 17–131 to 17–141.
Motorola, "MC 68030 Enhanced 32–Bit Microprocessor User's Manual Second Edition", 1989, P 2–28 to 2–29.

*Primary Examiner*—Kevin L. Ellis
*Attorney, Agent, or Firm*—Anthony N. Magistrale; Calfee, Halter & Griswold

[57] ABSTRACT

A mechanism is provided for supporting stack cache memory device management of POP read or PUSH write data in a computer system. The computer system further comprises a main memory and a processor associated with the stack cache memory device. The stack cache memory device includes at least one cache line having a plurality of address spaces arranged from a lowest address to a highest address. In response to the processor initiating a POP read or PUSH write operation, the mechanism provides logic for preventing placement of data in the cache which will not be reused by the processor, and for further preventing removal of data which may be reused by the processor.

5 Claims, 3 Drawing Sheets

CACHE MEMORY STORAGE SPACE MANAGEMENT SYSTEM AND METHOD

FIELD OF THE INVENTION

The present invention relates generally to microprocessor cache designs and more particularly to a stack cache support mechanism for use with a microprocessor having a main cache associated therewith.

BACKGROUND OF THE INVENTION

The memory included with computer systems typically includes a memory cache which comprises buffer storage that contains instructions and data frequently accessed by the processor in the system. Caches are typically constructed of cache lines which are boundaries between blocks of storage that map to a specific area in the cache. The cache lines are usually made up of a plurality of words having adjacent addresses.

Computer systems which include memory caches often support the software concept of memory stacks. Stacks represent areas in memory which store temporary register information and return addresses of subroutines. Most high level programming languages make use of stacks to support a variety of programming constructs.

Also referred to as pushdown storage, stacks permit normal read and write operations and also POP read and PUSH write operations. The operation of the stack in POP and PUSH operations is a last-in-first-out type of operation, that is, the last word written (PUSHED) into the stack is the first word retrieved (POPPED) from the stack. Register-based computer systems do not directly support stacks in the processor hardware and thus stacks must be implemented in such systems in memory. Because of this architectural limitation, performance is adversely affected when executing code which includes stack operations, especially in systems which include cacheable memory. The impact of stack operations on system performance is most obvious in systems built around IBM® 386 SLC processors or Intel® X86 processors both of which include a processor cache.

Read allocate and write allocate procedures are permitted with the memory concept of stacks. A read allocate procedure is triggered when the processor attempts to read data from the cache and the target data is not in the cache. This is referred to as a cache read miss case. In such a case, the processor retrieves the data directly from memory and copies it into the cache line in case it is needed again. A write allocate procedure occurs when the processor attempts to write to an address which is not in the cache (a cache write miss). In this case, the processor writes the data all the way to main memory and then loads the line of data into the cache from main memory in case it is needed again.

Read allocate and write allocate procedures, however, adversely affect system performance in systems which include caches and which permit POP read and PUSH write operations. For example, if the last word in a cache line is to be POPPED from the line, updating the cache line in the cache read miss case is unnecessary. Once the last word corresponding to a particular cache line has been read from main memory and passed to the processor, there is no need to copy it to the cache line because, being the last word to be POPPED in the cache line, the cache line is necessarily invalid.

Similarly, in the PUSH write case, if an address corresponding to the last word in a cache line is to be written to, updating the cache line from memory in the case of a cache write miss is again unnecessary. There is no need to load the entire cache line of data into the cache from main memory.

Read allocate and write allocate procedures, however, remain useful in systems having cacheable memory and supporting stack operations. It is an object of the present invention, therefore, to provide a stack cache logic mechanism which determines the times when read allocate and write allocate procedures should be implemented in stack operations to the cache in order to improve system performance, without adversely affecting non-stack memory and cache operations.

SUMMARY OF THE INVENTION

A cache management logic mechanism is provided which may be implemented in a computer system comprising a microprocessor, a main processor cache and a main memory. The main cache is a special-purpose buffer storage device which holds a copy of data and instructions frequently used by the processor. The processor, an Intel® X86-type or similar type processor, supports the software concept of stacks within the cache.

The stacks are implemented in the form of stack cache lines each comprising four words. The cache line structure supports POP read operations and PUSH write operations. During POP read operations, the highest addressed word is POPPED off of the stack. During PUSH write operations, the highest addressed word is PUSHED down into the stack and a next higher addressed word is written to the top of the stack.

The stack cache support logic of the present invention operates only during POP read and PUSH write stack operations to the cache. Normal read and write operations, either cacheable or non-cacheable, are managed by known computing procedures. A logical signal is provided to the cache from an instruction decoder on the processor to indicate whether the read or write operation initiated by the processor is a normal read or write operation or a POP read or a PUSH write operation.

Both POP read and PUSH write procedures result in either a cache hit or a cache miss scenario. In the POP read cache hit case, the processor attempts to POP read a data word from the cache and the data word it is attempting to read resides in a cache line in the cache. If the data word to be POPPED is not the highest address word in the cache line, normal cache operation ensues, wherein the cache line is not invalidated because other words in the cache line may still be POPPED and are therefore valid. If, however, the data word to be POPPED is the highest address word in the cache line, that word is the last possible word to be POPPED in that particular cache line and the other words in the cache line are necessarily invalid. The highest address word is passed to the processor and the processor is instructed to invalidate the cache line.

In the POP read cache miss case, the processor attempts to POP read a data word from the cache and the data word it is attempting to read does not currently reside in a cache line in the cache. If the address of the data word to be POPPED does not correspond to the highest address word in the cache line, normal cache operation ensues. If, however, the address of the data word to be POPPED corresponds to the highest address word in the cache line, the processor is instructed not to retrieve an entire cache line from main memory. Instead, the processor retrieves only the single targeted word from main memory, and does not copy it to the cache line.

In the PUSH write cache miss case, the address which the processor wants to write to has not yet been allocated into the cache, but is only in the main memory. Thus, the processor must write directly to main memory. If the stack cache support logic determines that the targeted address does not correspond to the highest address word in the cache line, the entire address cache line is loaded into the cache from main memory in case it is needed again by the processor. If, however, the stack cache support logic determines that the targeted address does in fact correspond to the highest address location in the cache line, a new cache line entry is created, that is, an address space is created in the cache for the highest address word. This address space is then updated (written to) by the processor and the cache line is specified as valid, even though the remaining three words in the cache line are invalid. The entire four word cache line is not loaded into the cache from the main memory. In the PUSH write cache hit case, the main memory is not accessed, and the entire cache line is updated by writing directly into the cache line.

DETAILED DESCRIPTION OF THE PREFERRED EMBODIMENT

Figure 1:
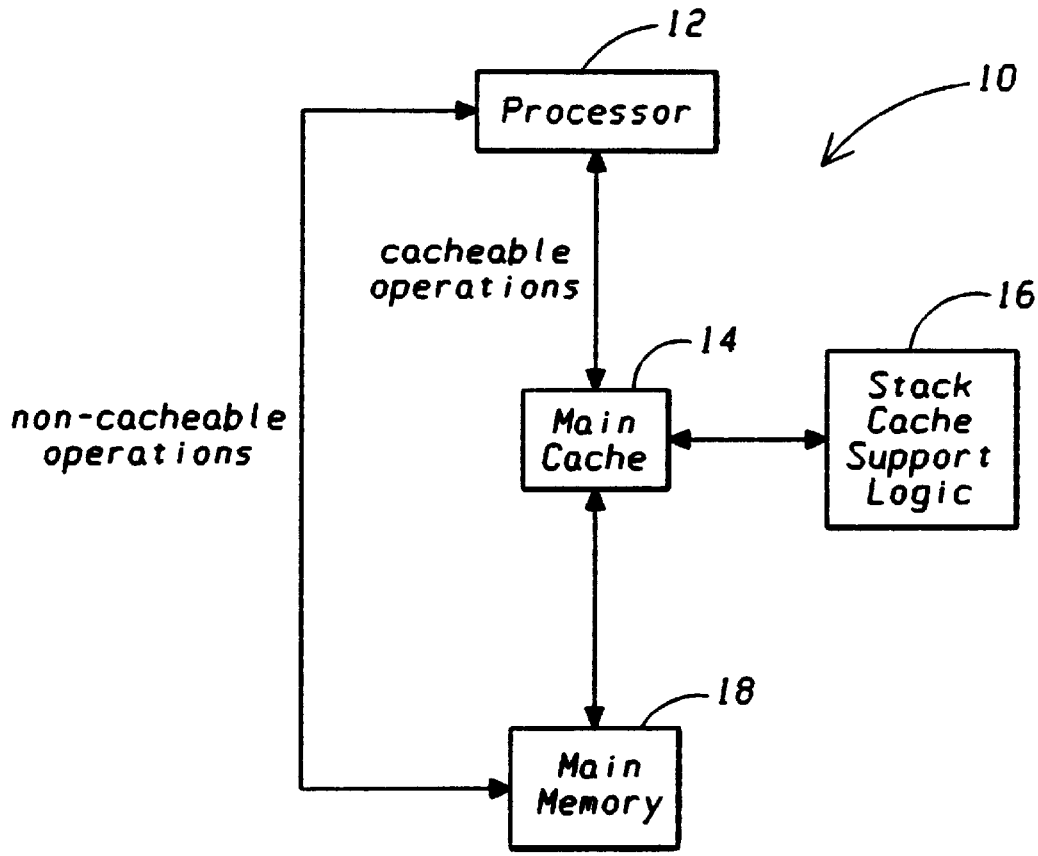
FIG. 1 is a block diagram of a processor-based computer system which includes stack cache support logic constructed according to the principles of the present invention.

A block diagram of a system 10 which incorporates the cache management logic mechanism provided by the present invention is provided in FIG. 1. The system 10 comprises a microprocessor 12, a main processor cache 14, stack cache support logic 16 and a main memory 18. The system elements shown may represent a variety of computer systems, but the invention is particularly useful in systems having an architecture which supports an Intel® X86-type processor and its associated communications protocol.

The main cache 14 is a special-purpose buffer storage device which is smaller and faster than main memory 18. The main cache 14 is used to hold a copy of data and instructions obtained from the main memory 18 which are likely to be needed next by the processor 12. The data and instructions likely to be contained in the main cache 14 are those which are frequently accessed by the processor 12, thereby serving to reduce the access time which would otherwise be required if the processor were to go to main memory for the data or instructions. As used herein, data, instructions and operands are referred to generally as "data".

Figure 2:
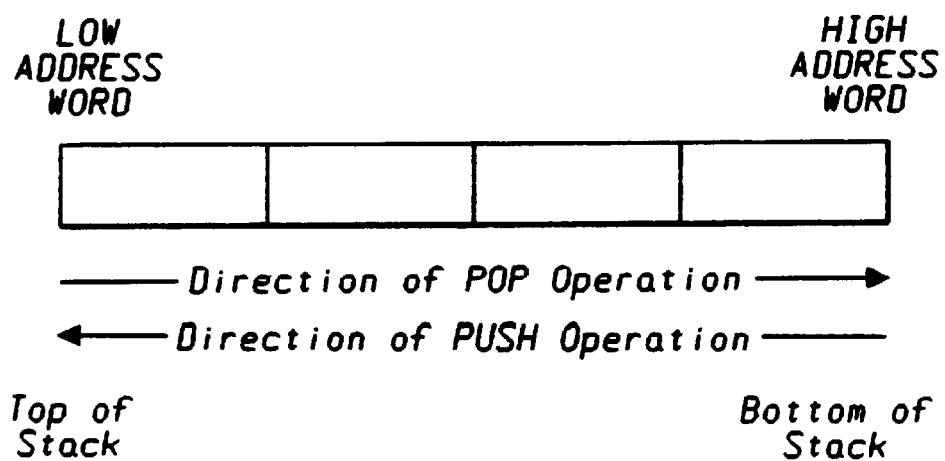
FIG. 2 is a diagram of the construction of a data cache line supported by the computer system of FIG. 1.

The processor of the system of FIG. 1, an Intel® X86-type or similar type processor, supports the software concept of stacks within the cache 14. The stacks are implemented in the form of cache lines, as shown in FIG. 2. The particular structure of the cache line in the preferred embodiment of the invention is a configuration comprising a four word line, each word being sixteen or thirty-two bits (two or four bytes, respectively), depending on the type of processor used. Of course, other configurations of a cache line are contemplated by the present invention.

The top of the stack comprises the lowest word address in the stack. The bottom of the stack comprises the highest address word in the stack. The Intel® X86 architecture utilizes a stack segment (SS) register and a stack pointer (SP) to implement the stack. The stack pointer (SP) points to the lowest word address in the stack, or the top of the stack, and the stack segment (SS) specifies the base address of the stack.

Typically, data is read and written into the cache line in groupings of four words, even if only one word is required to be written or read. Such operation saves memory access time should, as is often required, the next subsequent read or write operation involves a data word adjacent the word previously read or written.

The cache line structure of FIG. 2 supports POP read operations and PUSH write operations. For POP read operations, if a particular cache line of four words is successively POPPED four times, the cache line will be empty. As data words are POPPED off of the stack, the stack pointer points to successively higher addresses. The address of the stack pointer is automatically incremented with each POP operation.

For PUSH write operations, if a particular cache line of four words is successively PUSHED four times, the contents of the entire cache line will change. As data words are PUSHED into the stack, the stack pointer points to successively lower addresses. The address of the stack pointer is automatically decremented with each PUSH operation.

The processor 12 of the system 10 of FIG. 1 initiates two types of operations, both standard read and write operations to the main memory, either cacheable or non-cacheable, and stack operations to and from the cache. The stack cache support logic 16 shown in FIG. 1 operates only during POP read and PUSH write stack operations to the cache. Normal read and write operations, either cacheable or non-cacheable, are managed by known computing procedures.

A logical signal is provided to the cache 14 from an instruction decoder on the processor 12 to indicate whether the read or write operation initiated by the processor is a normal read or write operation or a POP read or a PUSH write operation. The stack cache support logic 16 is a functional algorithm which is implemented in hardware form, for example, in silicon, and which manages stack cache PUSH and POP operations based on the status of the logical signal output by the instruction decoder. The features introduced by the stack cache support logic are transparent to existing system software, and thus, no changes must be made to the existing software for a system to realize a significant performance gain.

Figure 3:
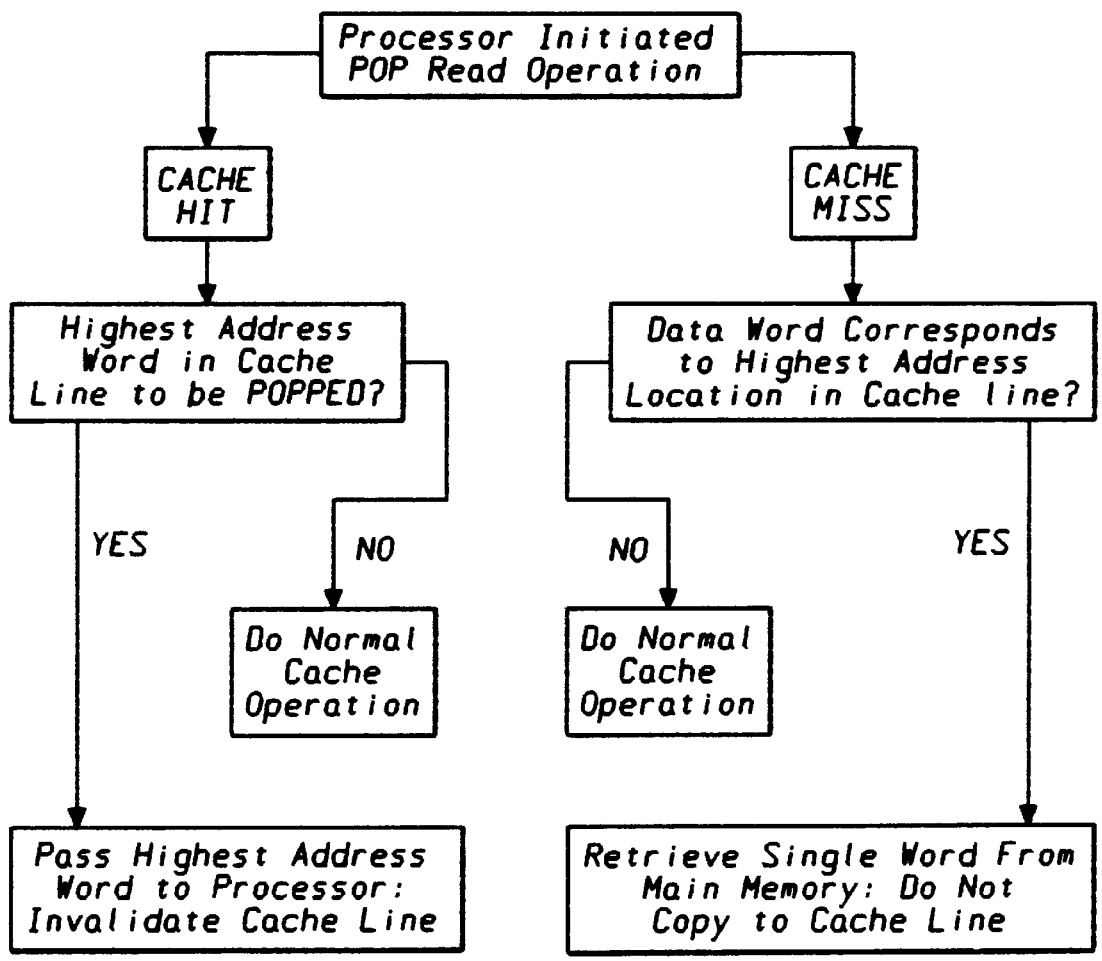
FIG. 3 is a block diagram of the stack cache support logic for managing a POP read operation.
Figure 4:
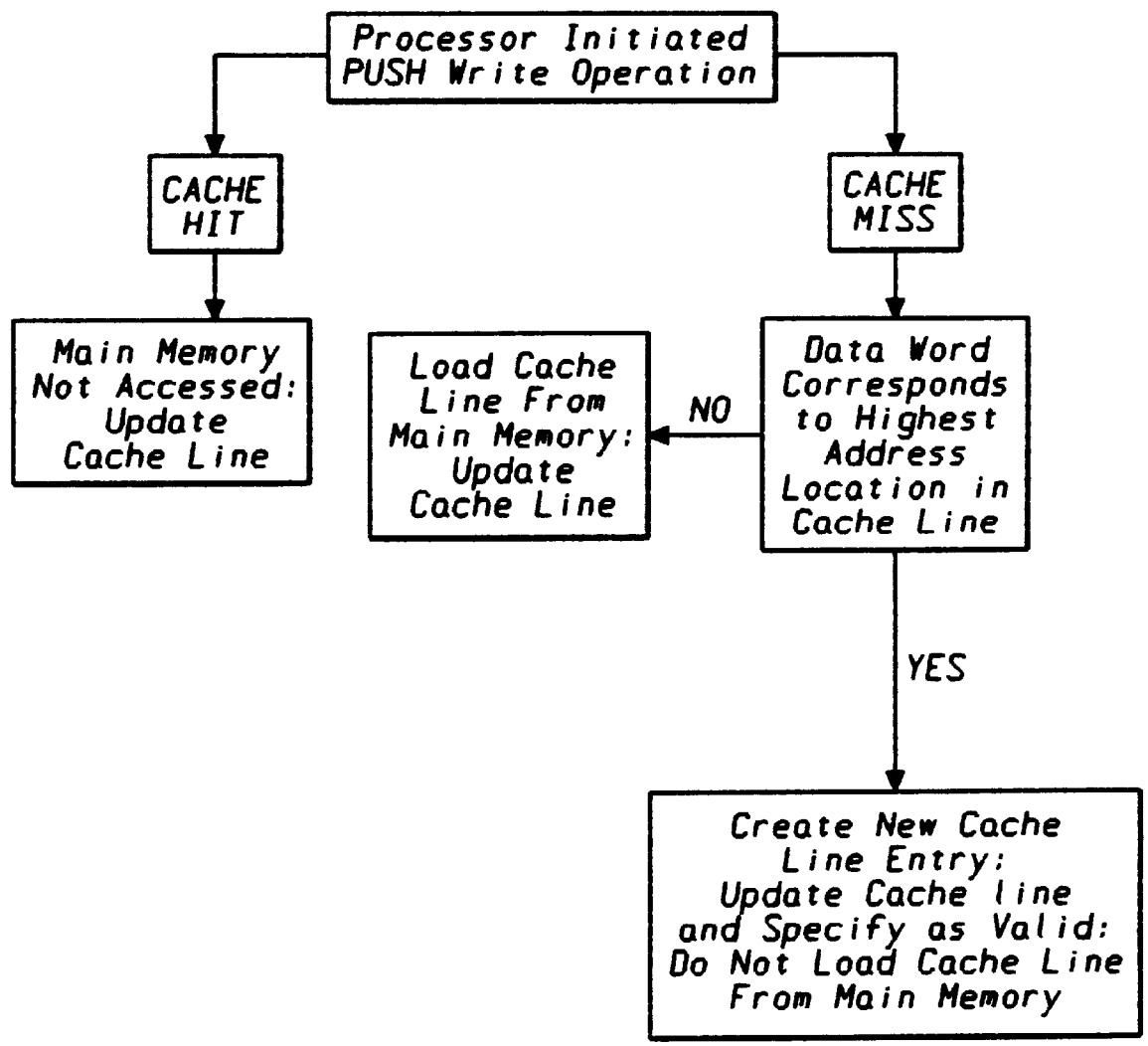
FIG. 4 is a block diagram of the stack cache support logic for managing a PUSH write operation.

FIGS. 3 and 4 are flow charts representing the operation of the stack cache support logic 16 of FIG. 1. FIG. 3 represents the logic for managing POP read operations and FIG. 4 represents the logic for managing PUSH write operations. As mentioned above, the logic represented in FIGS. 3 and 4 operates only if the logical signal provided by the instruction decoder in the processor indicates that the read or write operation is a POP or a PUSH, respectively.

As indicated by the flow chart of FIG. 3, a POP read operation will be initiated by the processor 12. The POP read operation will result in either a cache read hit case or a cache read miss case. In the cache read hit case, the processor attempts to POP read a data word from the cache 14 and the data word it is attempting to read resides in a cache line in the cache. If the data word to be POPPED is not the highest address word in the cache line, a normal cache operation ensues. During normal cache operation, the cache line is not invalidated because other words in the stack may still be POPPED and are therefore valid.

If, however, the data word to be POPPED is the highest address word in the cache line, that word is the last possible word to be POPPED in that particular cache line and the other words in the cache line are necessarily invalid. The highest address word is passed to the processor and the processor is instructed to invalidate the cache line. In this manner, the cache line is left empty and made available for other valid data.

Still with respect to FIG. 3 and the POP read operation, in the cache read miss case, the processor attempts to POP read a data word from the cache 14 and the data word it is attempting to read does not currently reside in a cache line in the cache. If the address of the data word to be POPPED does not correspond to the highest address word in the cache line, a normal cache operation ensues. If, however, the address of the data word to be POPPED corresponds to the highest address word in the cache line, the processor is instructed not to retrieve an entire cache line from main memory. Instead, the processor retrieves only the single targeted word from main memory, and does not copy it to the cache line. The read allocate mode, wherein the entire cache line is updated with the retrieved word and the adjacent words required to complete the line, is not entered into. The entire cache line is not updated because the word retrieved from memory, being the highest order address word in the cache line, and any other lower addressed words which the processor would otherwise have copied into the cache line in the read allocate mode, are necessarily invalid. Again, by this operation, the cache line is not allocated and left available for other valid data.

As indicated by the flow chart of FIG. 4, a PUSH write operation will be initiated by the processor 12. The PUSH write operation will result in either a cache write miss case or a cache write hit case. The first write to a particular cache line is necessarily a cache write miss case. In this case, the address which the processor wants to write to has not yet been allocated into the cache 14, but is only in the main memory 18. Thus, the processor must write directly to main memory.

In this cache write miss case, if the stack cache support logic 16 determines that the targeted address does not correspond to the highest address word in the cache line, the entire cache line is loaded into the cache from main memory in case the cache line is needed by the processor again. If, however, the stack cache support logic 16 determines that the targeted address does in fact correspond to the highest address location in the cache line, a new cache line entry is created, that is, an address space is created in the cache for the highest address word. This address space is then updated (written to) by the processor and the cache line is specified as valid, even though the remaining three words in the cache line are invalid. However, because the three words adjacent the highest order word are necessarily invalid, the entire four word cache line is not loaded into the cache from the main memory. Because the entire address line from main memory is not loaded into the cache, memory is not accessed, thereby improving system performance.

Still with respect to FIG. 4 and the PUSH write operation, in the cache write hit case, the main memory 18 is not accessed, and the entire cache line is updated by writing directly into the cache line. Whereas the first PUSH write to a particular cache line is by definition a cache miss, the second and subsequent PUSH writes to a cache line are necessarily cache write hits, because the cache line is always updated in the initial cache miss case.

Accordingly, the preferred embodiment of support logic for a microprocessor stack cache has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. A method of managing POP read data information contained in a stack cache memory device, in a computer system having a main memory and a processor associated with the stack cache memory device, said stack cache memory device including at least one cache line containing a plurality of words having adjacent address locations, said address locations arranged from a lowest address to a highest address within said at least one cache line, said method comprising the steps of:

(i) initiating a POP read operation with said processor to read data;

(ii) determining if said read data is c ontaine d within said stack cache memory device;

(iii) determining if said read data corresponds to the highest address word in said at least one cache line; and (iv)(a) passing said read data from said stack cache memory device to said processor and invalidating all of said plurality of address locations in said at least one cache line if said read data is contained within said stack cache memory device and said read data corresponds to the highest address word in said at least one cache line; or (iv)(b) directing said processor to retrieve said read data from said main memory without copying said read data to said at least one cache line if said read data is not contained within said stack cache memory device and said read data corresponds to the highest address word in said at least one cache line; else (iv)(c) not invalidating said at least one cache line if said read data does not correspond to the highest address word in said at least one cache line.

2. The method of claim 1, wherein said processor conforms to Intel® X86-type processor architecture.

3. The method of claim 1, wherein an instruction decoder on said processor provides a signal to said stack cache memory device to indicate that said read operation is a POP read operation.

4. The method of claim 3, wherein said cache line comprises a four word line.

5. The method of claim 4, wherein each word in said line comprises either sixteen or thirty-two bits.

* * * * *